United States Patent
Rodan et al.

(10) Patent No.: US 11,034,582 B2
(45) Date of Patent: Jun. 15, 2021

(54) COLD PLASMA OZONE GENERATOR

(71) Applicant: AQUALLENCE LTD ISRAEL, Jerusalem (IL)

(72) Inventors: Yuval Rodan, Beit Yizhak (IL); Meir Badalov, Netanya (IL); Moty Vizel, Jerusalem (IL)

(73) Assignee: AQUALLENCE LTD. ISRAEL, Jerusalem (IL)

( * ) Notice: Subject to any disclaimer, the term of this patent is extended or adjusted under 35 U.S.C. 154(b) by 253 days.

(21) Appl. No.: 15/766,789

(22) PCT Filed: Oct. 6, 2016

(86) PCT No.: PCT/IL2016/051087
§ 371 (c)(1),
(2) Date: Apr. 6, 2018

(87) PCT Pub. No.: WO2017/060907
PCT Pub. Date: Apr. 13, 2017

(65) Prior Publication Data
US 2018/0297844 A1    Oct. 18, 2018

Related U.S. Application Data

(60) Provisional application No. 62/238,718, filed on Oct. 8, 2015.

(51) Int. Cl.
*C01B 13/11* (2006.01)
*H05H 1/46* (2006.01)
(Continued)

(52) U.S. Cl.
CPC .......... *C01B 13/115* (2013.01); *C02F 1/4608* (2013.01); *C02F 1/78* (2013.01);
(Continued)

(58) Field of Classification Search
CPC ............... C01B 13/115; C01B 2201/12; C01B 2201/22; C01B 2201/32; C01B 2201/60;
(Continued)

(56) References Cited

U.S. PATENT DOCUMENTS 2,658,868 A   11/1953  Collison
3,954,586 A    5/1976  Lowther
(Continued)

FOREIGN PATENT DOCUMENTS

JP       S60332      1/1985
JP       08151202    6/1996
(Continued)

OTHER PUBLICATIONS

International Search Report of International Application No. PCT/IL2016/051087, filed Oct. 6, 2016, in the name of Yuval Rodan et al.
(Continued)

*Primary Examiner* — Xiuyu Tai
(74) *Attorney, Agent, or Firm* — Stetina Brunda Garred and Brucker

(57) ABSTRACT

The present invention provides a cold plasma ozone generator, comprising: an inlet gas port; at least one in-electrode, said in-electrode having a plurality of holes substantially at a perimeter of the same; said plurality of perimeter holes are in fluid communication with said inlet gas port, said plurality of perimeter holes configured to allow said dry gas to pass therethrough; at least one out-electrode, said out-electrode having at least one hole at the center of the same, said at least one hole configured to allow gas to pass therethrough; said in-electrode and said out-electrode configured to maintain said high voltage AC therebetween; at least one spacer between said in-electrode and said out-electrode, said spacer configured to maintain a constant-
(Continued)

width gap between said in-electrode and said out-electrode; an outlet port.

14 Claims, 11 Drawing Sheets

(51) Int. Cl.
    *C02F 1/46*     (2006.01)
    *C02F 1/78*     (2006.01)
    *H05H 1/24*     (2006.01)

(52) U.S. Cl.
    CPC ............ *H05H 1/2406* (2013.01); *H05H 1/46* (2013.01); *C01B 2201/12* (2013.01); *C01B 2201/22* (2013.01); *C01B 2201/32* (2013.01); *C01B 2201/60* (2013.01); *C01B 2201/62* (2013.01); *C01B 2201/64* (2013.01); *C01B 2201/66* (2013.01); *C02F 2201/782* (2013.01); *H05H 2001/2412* (2013.01); *H05H 2001/466* (2013.01); *H05H 2240/20* (2013.01); *H05H 2245/121* (2013.01)

(58) Field of Classification Search
    CPC ............ C01B 2201/62; C01B 2201/64; C01B 2201/66; C01B 2201/14; C01B 13/11; C02F 1/4608; C02F 1/78; C02F 2201/782; C02F 1/74; H05H 1/2406; H05H 1/46; H05H 2001/2412; H05H 2001/466; H05H 2240/20; H05H 2245/12; B03J 19/00; B01J 10/08; B01J 19/088; B01J 2219/0849; B01J 2219/0875
    See application file for complete search history.

(56) References Cited

U.S. PATENT DOCUMENTS

| | | |
|---|---|---|
| 4,048,668 A | 9/1977 | Von Bargen et al. |
| 5,529,760 A | 6/1996 | Burris |
| 6,027,616 A | 2/2000 | Babko-Malyi |
| 6,046,533 A * | 4/2000 | Nakatsuka ............... C01B 13/11 |
| | | 313/355 |
| 6,217,833 B1 | 4/2001 | Kolu |
| 8,328,982 B1 | 12/2012 | Babayan et al. |
| 9,067,788 B1 | 6/2015 | Spielman et al. |
| 2002/0170817 A1 * | 11/2002 | Goudy, Jr. ............... B01J 19/088 |
| | | 204/164 |
| 2004/0031676 A1 | 2/2004 | Brauer et al. |
| 2004/0197244 A1 | 10/2004 | Kirby |
| 2012/0156106 A1 * | 6/2012 | Murata .................... C01B 13/11 |
| | | 422/186.2 |
| 2015/0270110 A1 | 9/2015 | Eden et al. |

FOREIGN PATENT DOCUMENTS

| | | |
|---|---|---|
| JP | 10017304 | 1/1998 |
| JP | 2009081134 | 4/2009 |
| JP | 2009162478 | 7/2009 |

OTHER PUBLICATIONS

Written Report of the International Searching Authority for International Application No. PCT/IL2016/051087, filed Oct. 6, 2016, in the name of Yuval Rodan et al.

Nakada, Kosuke, Japanese Office Action Translation, Japanese Patent Application No. 2018-537737; dated Jul. 28, 2020; pp. 1-11.

* cited by examiner

COLD PLASMA OZONE GENERATOR

BACKGROUND OF THE INVENTION

Ozone is a very powerful gaseous reactant, and its usefulness has been well established for many years in a wide range of industrial applications. Recently, its value in all types of water purification applications has been coming to the fore because of its ability to act as a powerful oxidant, microflocculant and disinfectant without producing toxic byproducts.

Ozone generators are used domestically for indoor air purification and for elimination of odors. During food production, they are used to sterilize the food and to remove pesticides from fruits and vegetables, and are applied in food storage containers. In fisheries, ozone generators are used in marine produce storage containers, in freezers and in fish tanks, as well as in sterilization of water and disinfection in fish farms. In manufacturing, they are used for dying and bleaching, and their industrial applications include factory wastewater treatment, sewage treatment and drinking water supply purification.

The most widely used method of generating ozone is to flow dry air or oxygen through a narrow gap bordered on one side by a conductive electrode and on the other side by a dielectric electrode. An alternating high voltage is connected across the electrodes, producing a high voltage field across the gap which creates a corona discharge. This discharge, which is also known as a "silent discharge" or "cold plasma discharge" and is actually composed of many transient micro discharges, converts a percentage of the gas to ozone.

The majority of high quality prior art corona ozone generators have been designed for large-scale industrial-type applications. Today there is a great need in numerous water treatment applications for small standalone cells which are very reliable and yet reasonable in cost and easily maintained. Much of the prior art that has addressed this need consists of scaled down versions of previous designs, and because they still retain many of the large-scale design features, they are often extremely expensive, and they can be difficult to assemble and service as well.

Corona ozone generators usually fall into one of two general categories: either the concentric tubular type, in which an elongate annular corona gap is created between a metal tube and a dielectric tube, or the flat plate type, in which a flat corona gap is formed between a metal plate and a dielectric plate. Both types are well known in prior art, with numerous patents having been issued for designs in both categories.

However, current corona ozone generators typically suffer from the following defects:
1. Arcing either inside the cell or outside the cell.
2. A very high voltage (more than 5 KV) is needed between the electrodes to form ozone. Such high voltages generate lot of heat which shortens the life of the electrodes.
3. High power consumption.
4. Generation of heat generation, requiring constant cooling of the ozone generator.
5. Electromagnetic compatibility (EMC) issues, safety problems and difficulty getting UL (or other) certifications.
6. The electrodes have a short service life.

Therefore, there is a long-felt need for a reliable and inexpensive small ozone generator cell which does not suffer from the above problems.

SUMMARY OF THE INVENTION

It is an object of the present invention to disclose a system and method for providing ozone by means of a cold plasma ozone generator.

It is another object of the present invention to provide a cold plasma ozone generator to generate ozone from oxygen in a gas, said cold plasma ozone generator comprising:
an inlet gas port;
at least one in-electrode, said in-electrode having a plurality of holes substantially at a perimeter of the same; said plurality of perimeter holes are in fluid communication with said inlet gas port, said plurality of perimeter holes configured to allow said dry gas to pass therethrough;
at least one out-electrode, said out-electrode having at least one hole at the center of the same, said at least one hole configured to allow gas to pass therethrough; said in-electrode and said out-electrode configured to maintain said high voltage AC therebetween;
at least one spacer between said in-electrode and said out-electrode, said spacer configured to maintain a constant-width gap between said in-electrode and said out-electrode, said constant-width gap configured to allow said gas to pass from said plurality of perimeter holes in said in-electrode to said at least one hole in said out-electrode; and
an outlet port in fluid communication with said at least one hole in said out-electrode
wherein said cold plasma ozone generator requires no external cooling.

It is another object of the present invention to provide the cold plasma ozone generator as described above, wherein a thickness of said gap is in a range between about 0.1 mm and about 0.5 mm.

It is another object of the present invention to provide the cold plasma ozone generator as described above, wherein a thickness of said gap is about 0.3 mm.

It is another object of the present invention to provide the cold plasma ozone generator as described above, wherein said radially inward passage of said gas from said plurality of perimeter holes to said at least one central hole is configured to provide that said gas contacts substantially all of an area in said gap between said electrodes so as to maximize an amount of ozone in said gas.

It is another object of the present invention to provide the cold plasma ozone generator as described above, wherein said high voltage AC is about 1800 volts.

It is another object of the present invention to provide the cold plasma ozone generator as described above, wherein a frequency of said high voltage AC is between about 7 kHz and about 30 kHz.

It is another object of the present invention to provide the cold plasma ozone generator as described above, wherein a frequency of said high voltage AC is about 8 kHz.

It is another object of the present invention to provide the cold plasma ozone generator as described above, wherein an amount of ozone generated is controllable by adjustment of a frequency of said high voltage AC.

It is another object of the present invention to provide the cold plasma ozone generator as described above, wherein a coating of non-porous ceramic dielectric material is bonded to an electrode, said electrode selected from a group consisting of said at least one in-electrode, said at least one out-electrode and any combination thereof.

It is another object of the present invention to provide the cold plasma ozone generator as described above, wherein said non-porous ceramic dielectric coating is on a side of said electrode facing said gap.

It is another object of the present invention to provide the cold plasma ozone generator as described above, wherein a total thickness of said non-porous ceramic dielectric coating is about 100 to about 125 µm.

It is another object of the present invention to provide the cold plasma ozone generator as described above, wherein said non-porous ceramic dielectric coating is producible by means of a screen printing technique, followed by curing in an oven.

It is another object of the present invention to provide the cold plasma ozone generator as described above, wherein said gas is selected from a group consisting of oxygen, air and any combination thereof.

It is another object of the present invention to provide the cold plasma ozone generator as described above, wherein said air is dry air.

It is another object of the present invention to provide the cold plasma ozone generator as described above, wherein said inlet gas port is in fluid communication with a gas supplier selected from a group consisting of: an air dryer configured to dry gas passing therethrough, ran oxygen concentrator and any combination thereof.

It is another object of the present invention to provide a method of generating ozone from oxygen in a gas comprising steps of:
providing a cold plasma ozone generator comprising:
an inlet gas port;
at least one in-electrode, said in-electrode having a plurality of perimeter holes substantially at a perimeter of the same; said plurality of perimeter holes are in fluid communication with said inlet gas port, said plurality of perimeter holes configured to allow said dry gas to pass therethrough;
at least one out-electrode, said out-electrode having at least one hole at the center of the same, said at least one hole configured to allow gas to pass therethrough;
said in-electrode and said out-electrode configured to maintain said high voltage AC therebetween;
at least one spacer between said in-electrode and said out-electrode, said spacer configured to maintain a constant-width gap between said in-electrode and said out-electrode, said constant-width gap configured to allow said gas to pass from said plurality of perimeter holes in said in-electrode to said at least one hole in said out-electrode; and
an outlet port in fluid communication with said at least one hole in said out-electrode
connecting said an inlet gas port to a source of said feed gas;
providing said high voltage AC to a member of a group consisting of said in-electrode, said out-electrode and any combination thereof.
flowing said feed gas through said inlet gas port, through said plurality of perimeter holes, radially inward in said gap, through said at least one hole at said center of said out-electrode, and through said outlet gas port; thereby generating ozone from said oxygen in said feed gas
wherein said cold plasma ozone generator requires no external cooling.

It is another object of the present invention to provide the method as described above, additionally comprising a step of selecting a thickness of said gap to be in a range between about 0.1 mm and about 0.5 mm.

It is another object of the present invention to provide the method as described above, additionally comprising a step of selecting a thickness of said gap to be about 0.3 mm.

It is another object of the present invention to provide the method as described above, additionally comprising a step of maximizing an amount of ozone in said gas by flowing said gas radially inwardly from said plurality of perimeter holes to said at least one central hole thereby providing that said gas contacts substantially all of an area in said gap between said electrodes.

It is another object of the present invention to provide the method as described above, additionally comprising a step selecting said high voltage AC to be about 1800 volts.

It is another object of the present invention to provide the method as described above, additionally comprising a step of selecting said frequency of said high voltage AC to be between about 7 kHz and about 30 kHz.

It is another object of the present invention to provide the method as described above, additionally comprising a step of selecting said frequency of said high voltage AC to be about 8 kHz.

It is another object of the present invention to provide the method as described above, additionally comprising a step of controlling an amount of ozone generated by adjusting a frequency of said high voltage AC.

It is another object of the present invention to provide the method as described above, additionally comprising steps of bonding a coating of non-porous ceramic dielectric material to an electrode, and of selecting said electrode selected from a group consisting of said at least one in-electrode, said at least one out-electrode and any combination thereof.

It is another object of the present invention to provide the method as described above, additionally comprising a step of bonding said non-porous ceramic dielectric coating on a side of said electrode facing said gap.

It is another object of the present invention to provide the method as described above, additionally comprising a step of providing said non-porous ceramic dielectric coating with a thickness of about 75 to about 125 µm.

It is another object of the present invention to provide the method as described above, additionally comprising producing said non-porous ceramic dielectric coating by steps of: laying down at least one precursor layer by means of a screen printing technique, followed by a step of curing said precursor layer in an oven.

It is another object of the present invention to provide the method as described above, additionally comprising a step of selecting said gas from a group consisting of oxygen, air and any combination thereof.

It is another object of the present invention to provide the method as described above, additionally comprising a step of providing said air as dry air.

It is another object of the present invention to provide the method as described above, additionally comprising steps of removing water from said air by means of a gas supplier selected from a group consisting of: an air dryer configured to dry gas passing therethrough, ran oxygen concentrator and any combination thereof.

BRIEF DESCRIPTION OF THE DRAWINGS

FIG. 1b is a side elevation cross-sectional view of the embodiment of FIG. 1a;

FIG. 1c is an exploded perspective view of the cold plasma ozone generator of FIG. 1a;

DETAILED DESCRIPTION OF THE INVENTION

Figure 1A:
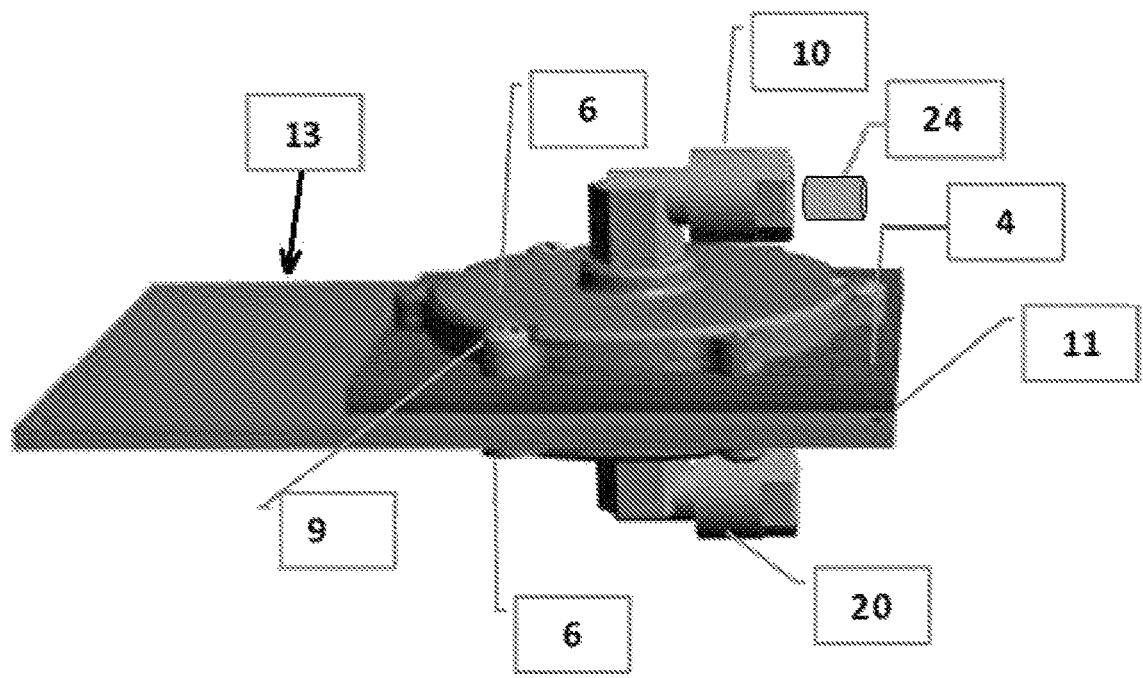
FIG. 1a is a perspective view of an embodiment of a cold plasma ozone generator of the present invention.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for efficiently generating ozone in a flat plate type dielectric barrier discharge (DBD) plasma reactor.

The term 'facility' hereinafter refers to a portion of an edifice, an edifice or a limited number of edifices supplied with water from a single source. Typically, the source is a pipe connected to a municipal water supply system. Non-limiting examples of a facility include a house, a business, a school, and an apartment building.

The term 'about' hereinafter refers to a range of plus or minus 25% around the nominal value. If a range of values is given, the extreme limits of the range therefore become (75% of the minimum of the range) to (125% of the maximum of the range).

The present invention is an improved flat plate type dielectric barrier discharge (DBD) plasma reactor.

The improved flat plate DBD cell for generating ozone has a generally convergent radial gas flow; the net gas flow direction through the plasma gap is from the outer edges of the cell inward towards an exit port in the approximate center of the cell. This eliminates parasitic arcing at the perimeter, greatly increases the life of the perimeter seal, and provides a homogenous gas flow which increases ozone output.

Prior art flat plate DBD cells are prone to arcing outside of the cell, which becomes more likely as the ambient humidity increases. Arcing outside the cell produces ozone outside of the cell, which is extremely undesirable because this ozone ends up inside the electronics cabinet and in the ambient air.

In the improved flat plate DBD cell of the present invention, external arcing is eliminated due to the long electrical path, to the isolation provided by the enclosures of the electrodes and by a design that makes it unnecessary to use wires to connect the electrodes to the power supply circuit. In some embodiments, the electrodes are assembled on the PCB and the lines connecting the electrodes to the power supply are inside the PCB and isolated from the environment so no external arcing can occur. In other embodiments, the electrodes are connected to the power supply by connectors inside the electrodes themselves, again eliminating wires and preventing eternal arcing.

The cell design allows both electrodes to be operated at high voltage, therefore, instead of one electrode being essentially at ground with the full voltage applied to the other electrode, each electrode has at a voltage difference from ground of approximately half the total voltage difference between the electrodes, reducing the effective voltage difference with respect to ground by half and increasing the safety of the device.

Most prior art ozone cell construction requires that one electrode be at ground potential. The present invention has no permanent ground electrode, it has a "floating ground" and is designed to be able to operate either with one electrode grounded and the other at 1.8 KV or preferably with both electrodes at 0.9 KV (generally 180 degrees out of phase from each other). Operating both electrodes at high voltage effectively halves the voltage difference with respect to ground in any portion of the cell, which together with the generous radii of all external surfaces eliminates problems of corona, arcing and ozone formation on the outside of the cell.

This greatly increases the service life of the electrodes because both electrodes have equal electric and mechanical stresses, as opposed to prior art ozone generators where one electrode is always ground potential and substantially unstressed, while the other undergoes both electrical and mechanical stresses and thus will be ruined faster than the ground electrode.

This greatly increases safety, makes mounting and weather protection less critical and UL and other safety approval less difficult, and allows the use of less expensive and more commonly available high-voltage transformers such as the midpoint ground type of neon-sign transformer. The plasma cell of the present invention ignites easily at all temperatures without requiring a special starting circuit.

The high voltage necessary to drive the corona discharge is produced by a power supply which includes a transformer capable of transforming low DC voltage to a high AC voltage. In prior art ozone generators, the voltage is usually between 5 and 25 kilovolts. Minimizing the voltage at which an ozone generator operates is of very great importance, for this not only minimizes the high-voltage stress on all components for longer life, but is also safer, minimizes arcing and external corona, and decreases the cost of the transformer. At a fixed voltage, the quantity of ozone generated is roughly proportional to the continuous wave AC frequency or the pulse repetition rate until an upper frequency limit is reached. The practical upper limit for efficient ozone generation usually lies between 600 and 2500 Hz, and depends on corona cell geometry, properties of the dielectric used and cooling efficiency.

In the present invention the corona is operated at a relatively low voltage, about 1800 volts and at a relatively high frequency, on the order of 8 kHz, at which the corona is stable and homogeneous and the average output power and therefore the amount of ozone generated is controlled by adjusting the frequency (between about 7 kHz and about 30 kHz) rather than the voltage.

This high frequency cold plasma ozone generator offers a very compact design due to smaller transformers and corona cells needed to operate it. As the corona is occurring up to 8,000 times per second, there is no need for a large air gap and a high voltage.

This high frequency cold plasma ozone generator is very energy efficient and compact in size allowing for a very flexible platform to either use multiple cells for redundancy or other configuration changes.

Typically, trade-offs in design parameters of a corona cell for an ozone generator include the width of the discharge gap (the distance between the faces of the electrodes) and the voltage necessary to achieve an appropriate voltage gradient between the electrodes. Generally, the wider the discharge gap, the greater the voltage must be and the greater the current necessary to sustain that higher voltage. Higher voltages in ozone generators can be problematic, causing a significant amounts of the power supplied to the ozone generator to be dissipated as heat, which can destroy some or all of the ozone which is formed. Thus, to obtain an optimum net yield of ozone from the ozone formation reaction, it is advantageous to have a narrower gap between the electrodes, thereby lowering the voltage needed to achieve the necessary potential for the reaction. Of course, with lower voltages, lower currents can be employed and so less power will be dissipated into heat. The net effect, then, of a narrower discharge gap is a more efficient ozone generator, with more ozone obtainable from the system since, by utilizing lower voltages and, therefore, lower currents, to achieve the ozone formation reaction, less heat dissipation occurs and less of the ozone produced through the ozone formation reaction is destroyed by heat after formation.

Unlike prior art ozone generators that require air or water to cool the electrodes, the present invention does not require any kind of electrode cooling since, because the voltage is small (1700-1800 V) and the gap is very narrow (200-400 micron), the amount of power dissipated as heat is small enough that, under normal operating conditions, the electrodes will not heat significantly This invention is a very high efficiency cold plasma ozone generator, with a very high ozone yield of about 90 gram $O_3$/kWh when dry air used as the feed gas and 267 gram $O_3$/kWh when oxygen used as the feed gas.

The cold plasma ozone generator can operate with a feed gas of dry air, a feed gas of oxygen and any combination thereof.

In the present invention, both electrodes are coated with ceramic non-porous dielectric material.

The dielectric layer prevents the desired controlled silent discharge from changing into a glow or arc discharge that would damage or even destroy the electrodes due to high currents. Therefore, the electrodes of the present invention have very long life. In addition, ensuring a silent discharge evenly distributed across the surface of the electrodes results in an optimum yield of ozone, which leads to a higher efficiency ozone generator.

The discharge utilizing non-porous dielectric barrier was more uniform and synthesized ozone with higher energy efficiency than the discharge utilizing smooth-surface dielectric barrier.

The non-porous dielectric discharge of the present invention uses less than 30% of the power delivered by the prior art rough-surface dielectric discharge in order to achieve the same level of ozone yield.

FIG. 1a is a perspective view of the embodiment. This view illustrates the enclosures (6) for the electrodes, the PCB electrode with its conductive pad (4), the two 90 degree ozone resistant fittings forming the inlet gas port (10) and the outlet gas plus ozone port (20), and the screws (9) that fasten an electrode enclosure (6), a PCB electrode (4) and a PCB spacer (11) to the main high voltage AC power supply PCB (3). The conductive electrodes with a non-porous ceramic dielectric coating and the sealing components are not visible in this view.

Figure 1B:
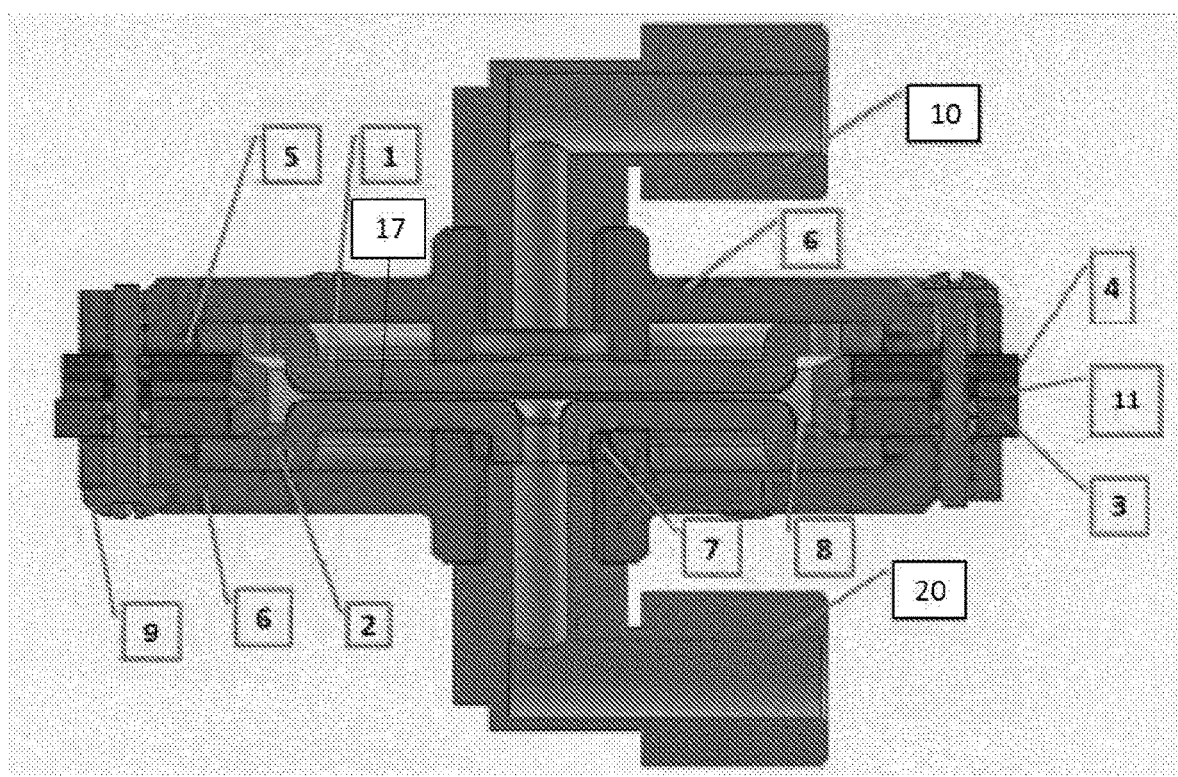

FIG. 1b is a side cross-sectional view of the embodiment of FIG. 1a

The electrodes (1, 2) are preferably plates of stainless steel coated with ceramic dielectric material, and are preferably of the same size and shape and have the same non-porous ceramic dielectric coating. They can be generally circular, oval or elliptical, it can form a rounded rectangle, and any combination thereof, as long as all conductive edges are rounded to reduce non-linear high voltage field effects which can lead to parasitic corona and arcing.

The in-electrode (1) has a plurality of holes in the perimeter, so that gas from the inlet fitting (10) flows downward and outward to the perimeter of the in-electrode, through the perimeter holes, and then radially inward from the perimeter of the gap to its center.

The out-electrode (2) has at least one hole, and preferably a single hole, in the center, so that gas flows directly from the out-electrode to the outlet gas port (20).

The PCB spacer (11) design provides accurate spacing and accurate parallelism between the in- and out-electrodes (1, 2), resulting an accurate, and uniform plasma gap between the generally flat central portions of the faces of the in-electrode (1) and the out-electrode (2).

The thickness of the plasma gap is dependent on the thickness of the non-porous ceramic dielectric coating, thickness of the main PCB (3), PCB spacer (11), PCB electrode (4) and on the geometry of the in- and out-electrodes (1, 2). In a preferred embodiment, the gap is about 0.3 mm. It can range from about 0.1 mm to about 0.5 mm.

Since the cell is sealed, the gas cannot leak from the cell. The electrodes are sealed externally by enclosure O-ring (5), forming a perimeter seal with the main PCB (3) and the PCB electrode (4). Preferably, the O-ring (5) is made of non-conductive ozone-resistant material such as silicone, PVDF or PTFE, while the plasma gap is sealed by a Teflon O-ring (8) that seals the gaps and prevents ozone from leaking and damaging the PCB's. Another important seal is the electrode O-ring (7) which prevents ozone from escaping from the cell and damaging other components like electrode enclosure (6) and the PCB's.

This sealing technology provides secure hermetic sealing that prevents leaks of both feed gas and ozone. Therefore, this design enables use of less-expensive non ozone-resistant material for the electrode enclosures (6), PCB spacer (11), and the PCB electrode (4). This also allows the option of assembling the cold plasma reactor on the main high voltage AC power supply PCB (3).

Figure 1C:
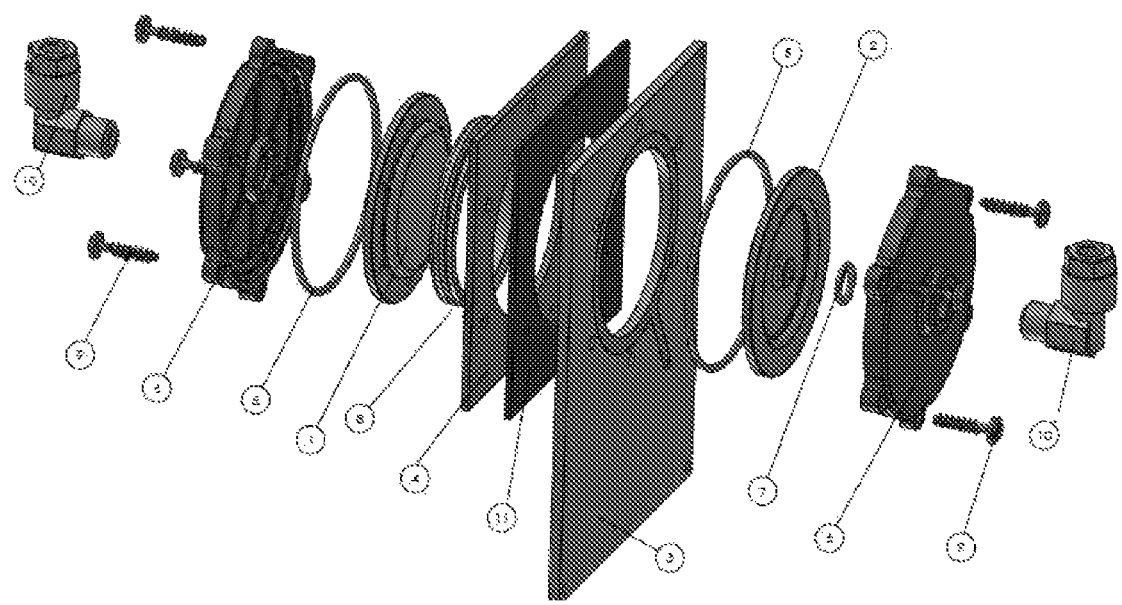

FIG. 1c is an exploded perspective view of the cold plasma ozone generator of FIG. 1a. This view illustrates that the assembly and the maintenance of this electrode is very simple. These components are preferably held in their assembled position by 3 screws (11) from each side.

Unlike prior art ozone generators, the cell is an integral part of the high voltage AC power supply PCB (3), rather than being separate from it. This allows the lines that provide high voltage to the electrodes to be internal connections within the main PCB (3), rather than being external wired connections. This increases the safety of the ozone generator, makes approval for safety (such as UL approval) less difficult, and reduces both assembly time and the cost of assembly.

FIGS. 1d-h show another embodiment of the cold plasma ozone generator of the present invention. Part numbers are different between the embodiment of FIGS. 1a-c and the embodiment of FIGS. 1d-h.

Figure 1D:
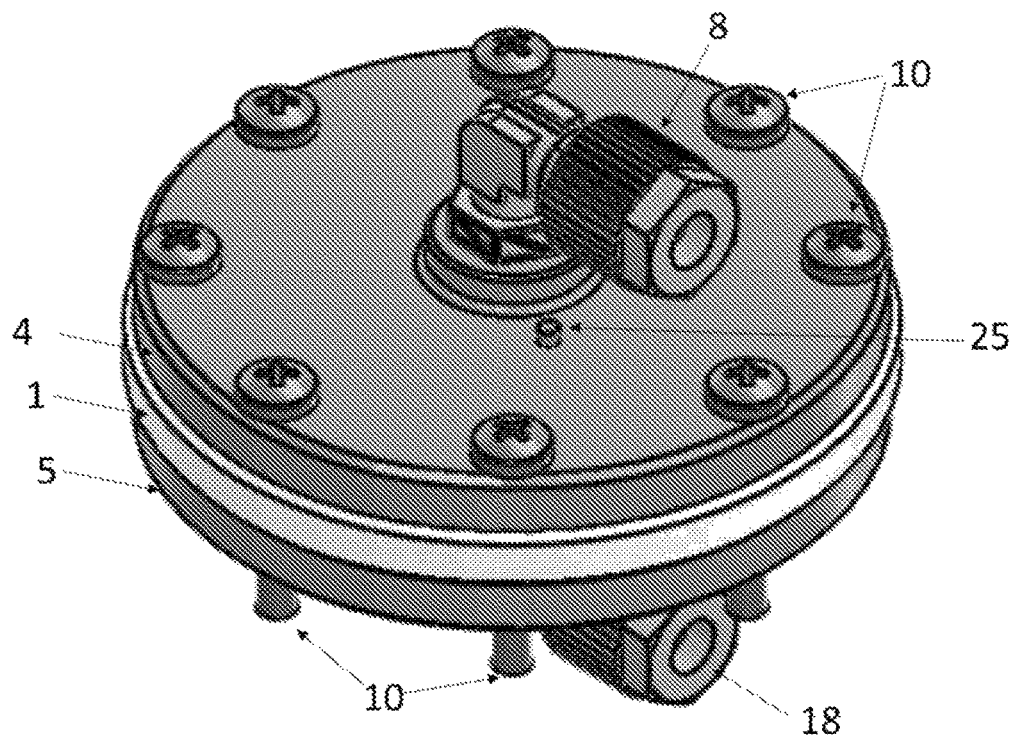
FIG. 1d is a perspective view of another embodiment of a cold plasma ozone generator of the present invention.
Figure 1E:
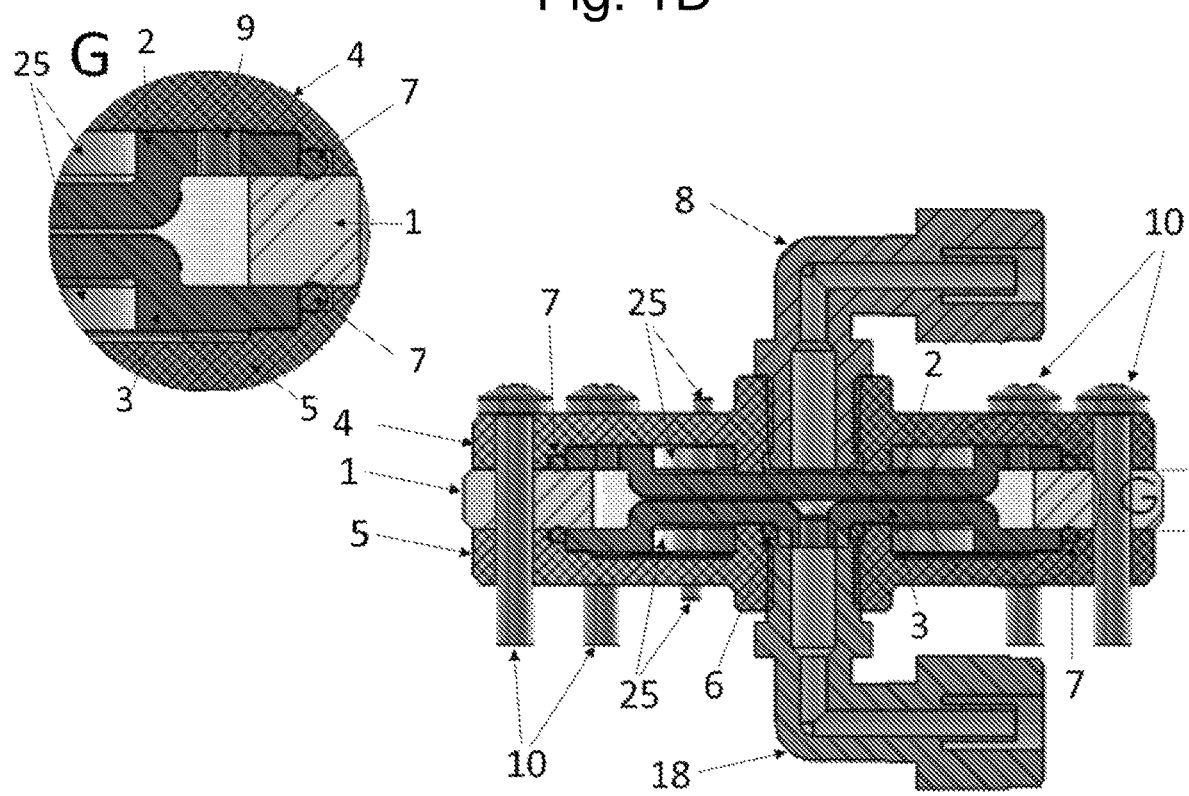
FIG. 1e is a side cross-sectional view of the embodiment of FIG. 1d.

FIG. 1d is a perspective view of the embodiment. This view illustrates the enclosures (4, 5) for the electrodes (3, 2, not shown), the two 90 degree ozone resistant fittings forming the inlet gas port (8) and the outlet gas plus ozone port (18), and the screws (10) that fasten together the electrode enclosures (4, 5) and the electrode spacer (1). Also shown is the spring mechanism (25) which ensures good contact between the electrodes and the PCB FIG. 1e is a side cross-sectional view of the embodiment of FIG. 1d The in-electrode (2) and the out-electrode (3) are preferably plates of stainless steel coated with ceramic dielectric material, and are preferably of the same size and shape and have the same thickness of the same type of non-porous ceramic dielectric coating. They can be generally circular, oval or elliptical, it can form a rounded rectangle, and any combination thereof, as long as all conductive edges are rounded to reduce non-linear high voltage field effects which can lead to parasitic corona and arcing.

In less-preferred embodiments, at least one of the following can be true: at least one of the in-electrode and the out-electrode lacks a non-porous ceramic dielectric coating, the in-electrode and the out-electrode have different thicknesses of non-porous ceramic dielectric coating, and the in-electrode and the out-electrode have different types of non-porous ceramic dielectric coating, The electrode spacer (1) design provides accurate spacing and accurate parallelism between the in- and out-electrodes (2, 3), resulting an accurate, and uniform plasma gap between the generally flat central portions of the faces of the in-electrode (2) and the out-electrode (3).

The thickness of the plasma gap is dependent on the thickness of the non-porous ceramic dielectric coating, which is on the sides of the in-electrode and the out-electrode that face each other, so that the surface of each non-porous ceramic dielectric coating forms one face of the gap; on the thickness of the electrode spacer (1); and on the geometry of the in- and out-electrodes (2, 3). In a preferred embodiment, the gap is about 0.3 mm. It can range from about 0.1 mm to about 0.5 mm.

Since the cell is sealed, the gas cannot leak from the cell. The electrodes are sealed externally by the enclosure O-rings (7), forming a perimeter seal with the enclosures (4, 5), the electrode spacer (1) and the in- (2) and out- (3) electrodes. Preferably, the O-rings (7) are made of non-conductive ozone-resistant material such as silicone, PVDF or PTFE, while the out-electrode O-ring (6) which prevents ozone from escaping from the cell and damaging other components can be made of non-conductive ozone-resistant material such as silicone, PVDF or PTFE, or can be made of Teflon.

This sealing technology provides secure hermetic sealing that prevents leaks of both feed gas and ozone. Therefore, this design enables use of less-expensive non ozone-resistant material for the electrode enclosures.

In this embodiment, the PCB's and the electrodes are separately replaceable, thereby reducing the cost of repairs.

Figure 1F:
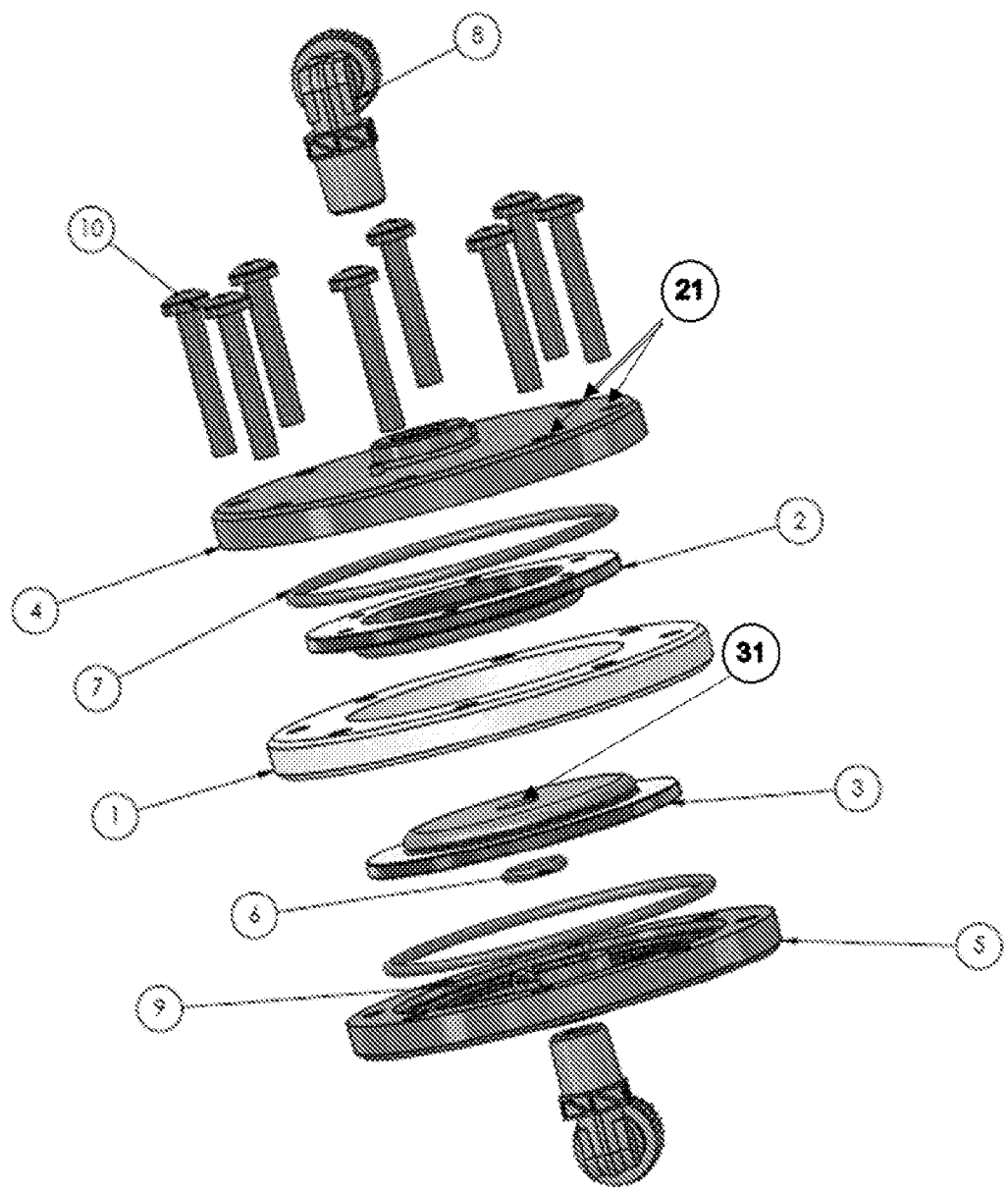
FIG. 1f shows an exploded view of the embodiment of an ozone generating cell of FIG. 1d.

FIG. 1f shows an exploded view of the embodiment of an ozone generating cell of FIG. 1d.

The inlet gas port (8) is at the top, with the screws (10) below the inlet gas port (8) and the inlet enclosure (4) is between the screws (10) and the upper enclosure O-ring (7). Below the upper enclosure O-ring (7) is the in-electrode (2).

The in-electrode (2) has a plurality of holes (21) in the perimeter, so that gas from the inlet fitting (8) flows downward and outward to the perimeter of the in-electrode, through the perimeter holes, and then radially inward from the perimeter of the gap to its center.

Below the in-electrode (2) is the spacer (1), and below the spacer is the out-electrode (3). In this embodiment, the out-electrode (3) has a single hole (31) in the center, through which gas can leave the gap and enter the outlet gas port (18).

Below the out-electrode (3) is the out electrode O-ring (6), and below this, the lower enclosure O-ring (7), the outlet enclosure (5), which comprises voltage connectors to ensure that there is a good electrical connection between the voltage contacts on the PCB and the in- (2) and out- (3) electrodes, so that the high voltage is efficiently transferred from the PCB to the electrodes (2, 3).

Below the outlet enclosure (5) is the outlet gas port (18).

Figure 1G:
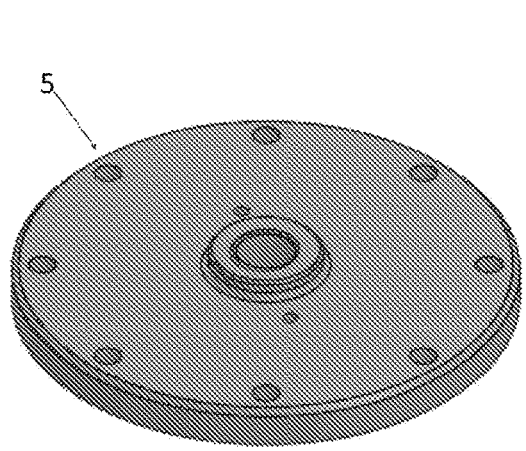
FIG. 1g shows the outside of the outlet enclosure of the embodiment of an ozone generating cell of FIG. 1d.
Figure 1H:
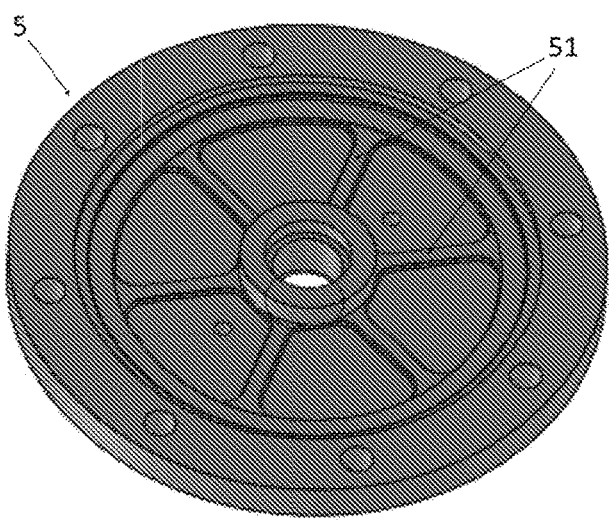
FIG. 1h shows the inside of the outlet enclosure of the embodiment of an ozone generating cell of FIG. 1d.

FIG. 1g-h shows the outside (FIG. 1g) and inside (FIG. 1h) of the outlet enclosure (5), showing the strengthening ribs (51) on the interior of the outlet enclosure (5). The ribs both stiffen and lighten the outlet enclosure (5).

Figure 2:
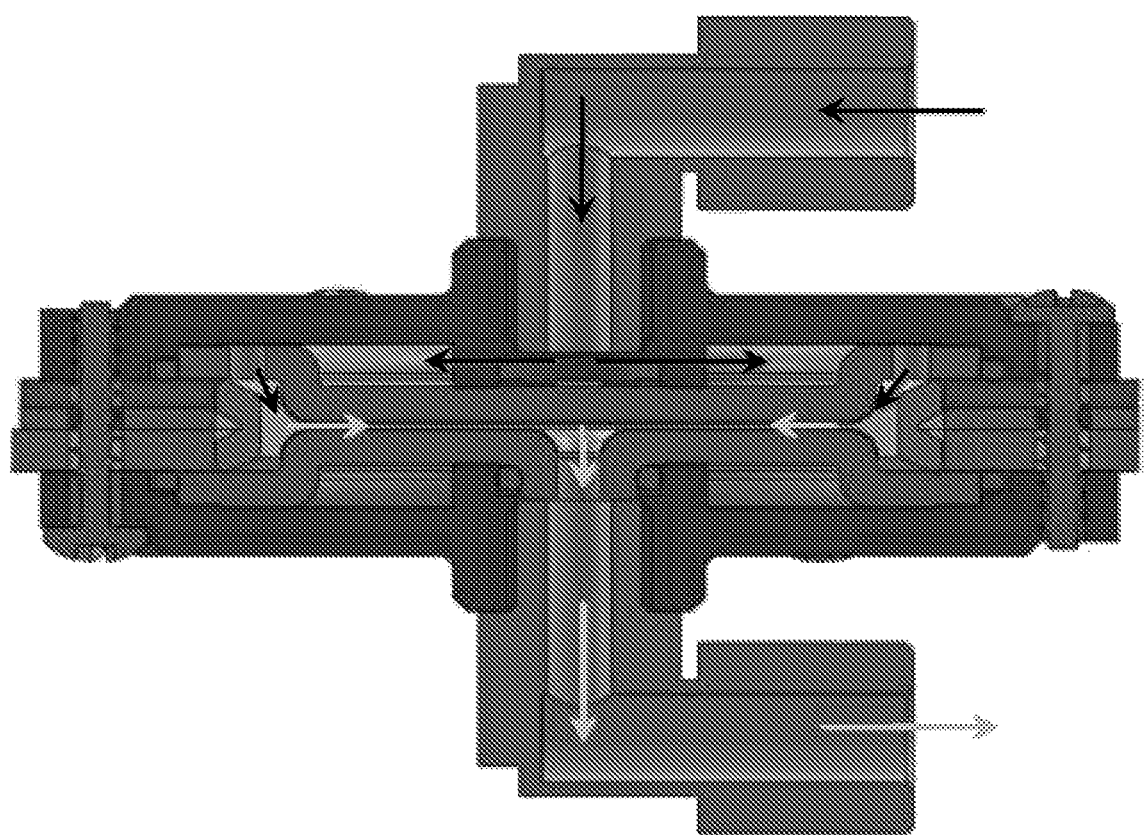
FIG. 2 shows the gas flow inside an ozone generator cell.

FIG. 2 shows the gas flow inside a cold plasma ozone generator cell. The gas feed, which is typically atmospheric air, but can be air enriched with oxygen or pure oxygen, enters through the inlet gas port (9) and passes to the center of the upper surface of the in-electrode (1). The flow then passes radially across the upper surface of the in-electrode (1) to the perimeter of in-electrode (1) (represented by black arrows) and enters the plasma gap through the holes in the perimeter of the in-electrode (1).

The gas then flows radially inward (white arrows) from the perimeter to the center of the in- (1) and out- (2) electrodes. The gas then exits from the plasma gap via the single hole in the center of the out-electrode (2) and exits the cold plasma ozone generator through the corresponding ozone outlet fitting (10).

The electrodes (1, 2) are kept at a high voltage supplied by an AC power supply (3). Since the voltage across the electrodes is uniform and the spacing between the electrodes is uniform, there will be a uniform plasma in the plasma gap. As the air flows through the plasma gap, it is subjected to repeated micro discharges, which convert some of the oxygen molecules in the air into ozone molecules. Therefore, the air flowing out of the cold plasma ozone generator will be ozone enriched.

The radial flow ensures that the air contacts substantially all of the area in the plasma gap between the electrodes (1, 2) and that the air spends sufficient time between the electrodes so as to maximize the amount of ozone in the exit gas.

This results in a very reliable and efficient cold plasma ozone generator with a high and stable yield ozone. Typically, the yield is about 90 gram $O_3$/kWh when dry air used as the feed gas and 267 gram $O_3$/kWh when oxygen is used as the feed gas.

Non-Porous Ceramic Dielectric Coating on Electrodes

Figure 3A:
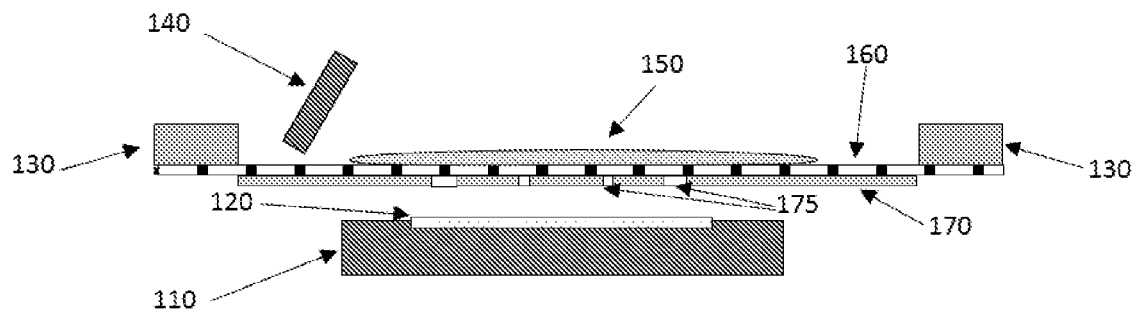
FIG. 3a-c illustrates an embodiment of a screen-printing process for laying down the precursor layers to form a dielectric coating on a stainless steel electrode.
Figure 3B:
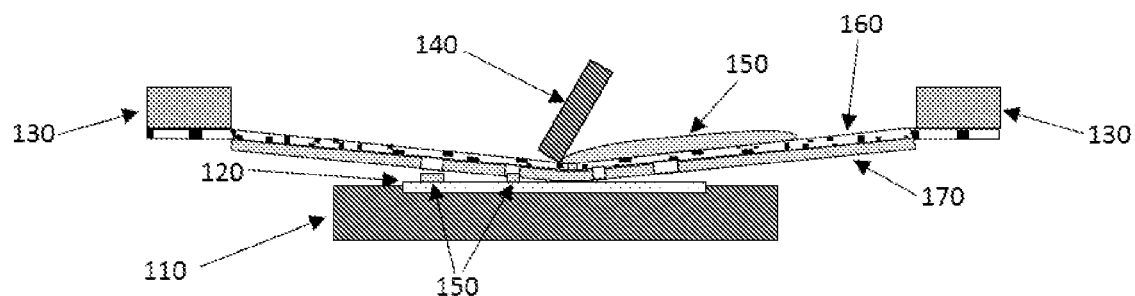
Figure 3C:
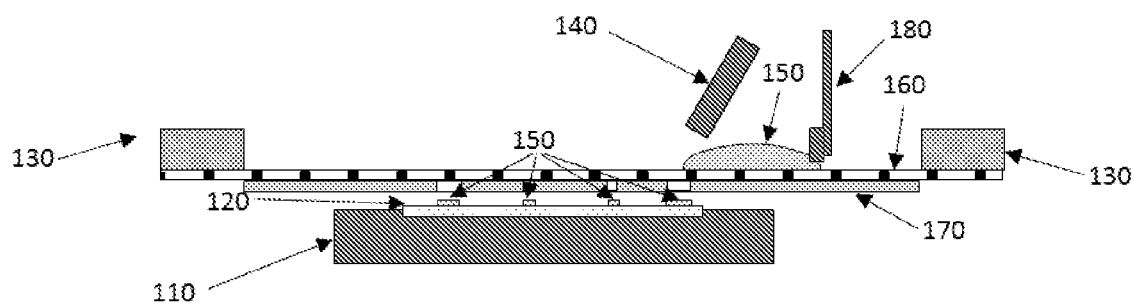

In some embodiments of the system of the present invention, the non-porous ceramic dielectric coating on the electrodes is a multilayer thick-film coating. This non-porous ceramic dielectric coating can be produced using a screen-printing technique, as shown in FIG. 3a-c. FIG. 3a shows the beginning of the process of laying down one layer; FIG. 3b shows an intermediate stage in the process of laying down the layer, and FIG. 3c shows the end of the process of laying down the layer. In this embodiment, the electrode (120) is firmly held by a substrate (110) so it does not slip during processing. A mesh screen (160) is held by a frame (130) at a distance above the electrode (110), the distance small enough that pressure from a squeegee (140) can cause the mesh screen (160) to come into contact with the electrode (120). On the upper side of the screen is a precursor for a dielectric, in the form of a paste (150). On the lower side of the screen (160) and adhering to the screen (160) is a layer of emulsion (170); the holes (175) in the emulsion (170) allow the paste (150) to pass through the emulsion (170) and come into contact with the electrode (120).

At the beginning of the process, the paste dielectric precursor (150) forms a layer on top of the mesh screen (160).

In order to form the image on the electrode (120), the squeegee (140) is pressed down onto the mesh screen (160), bringing the portion of the emulsion (170) directly under the squeegee (140) into contact with the electrode (120). As shown in FIG. 3b, the squeegee (140) is them moved across the upper surface of the electrode (120), pressing paste (150) through the holes (175) in the emulsion (170) and onto the electrode (120). The squeegee also presses the paste (150) ahead of itself.

At the end of the process of laying down the layer (FIG. 3c), the squeegee (140) has crossed entirely over the electrode (120), and has forced paste (150) through all the holes (175) in the emulsion (170). A stop (180) prevents unnecessary loss of paste, which can be reused for another electrode or another layer. The mesh screen (160) can now be removed and the paste precursor (150) processed into a non-porous ceramic dielectric coating.

The dielectric precursor layer is then cured, transforming it into a non-porous ceramic dielectric coating. In the curing process, the paste-coated electrode is placed in a drying oven at about 150 degrees C. for a few minutes (<10 minutes) to dry the paste and vaporize elements such as solvents and adhesion promoters. The electrode is then placed in an oven and heated, at a predetermined rate, to about 900 degrees C. The oven temperature is held at about 900 degrees C. for about 15 minutes, after which the electrode is cooled at a predetermined rate.

In a typical embodiment of the coated electrodes of the present invention, the above process, of screen printing a precursor layer, drying in a drying oven and then heating to about 900 degrees C. is repeated 3-5 times, each time producing a ceramic dielectric layer about 20 µm to about 25 µm thick so that the total thickness of the non-porous ceramic dielectric coating is about 75 µm to about 125 µm. In this manner, the non-porous ceramic dielectric coating can be produced without cracks.

In this process, the high temperature combustion process causes the first layer of the non-porous ceramic dielectric coating to migrate a few µm into the surface of the stainless steel electrode, thereby improving the adhesion of the non-porous ceramic dielectric coating to the electrode.

In preferred embodiments, the non-porous ceramic dielectric coating material has about the same coefficient of expansion as the stainless steel of the electrode, so that the non-porous ceramic dielectric coating will not crack or spall during heating or cooling of the electrode during use.

In general, the above-described process will not produce a completely homogenous non-porous ceramic dielectric coating nor a non-porous ceramic dielectric coating of completely uniform thickness. However, the uniformity will be sufficient to prevent formation of air pockets, and the non-porous ceramic dielectric coating will be flat enough and homogeneous enough to prevent arcing or breakdown that can reduce the reliability and lifetime of the electrodes.

Example 1

Figure 4A:
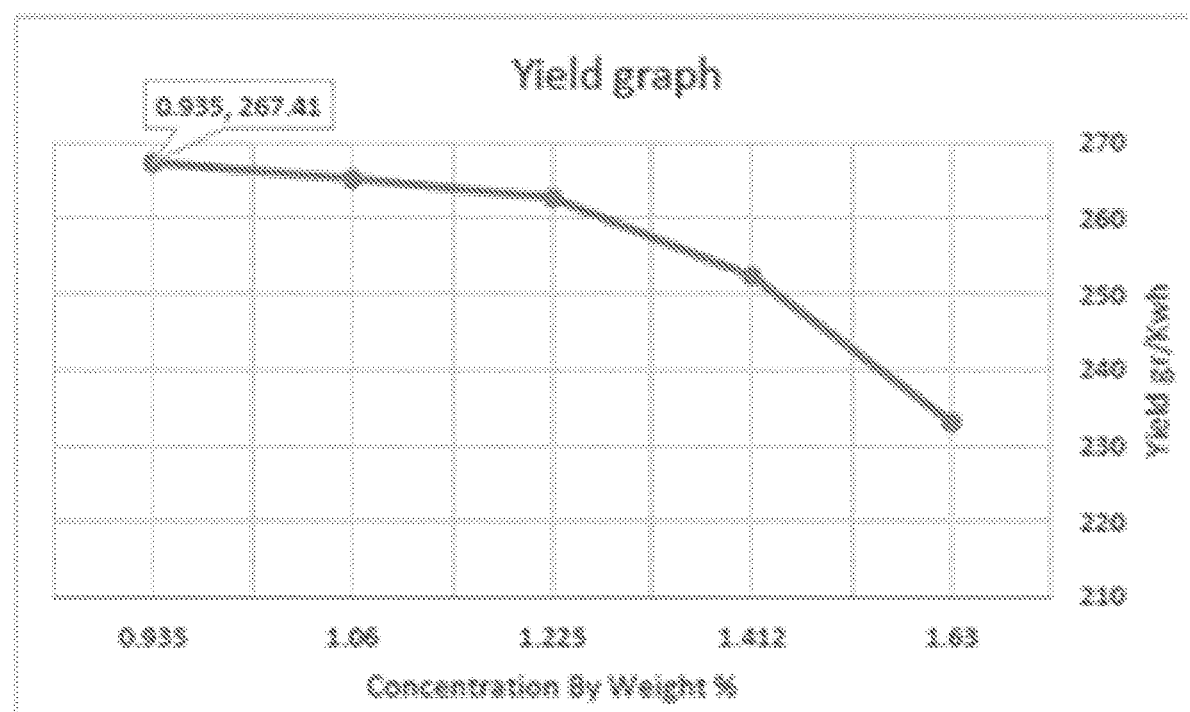
FIG. 4a illustrates the amount of power needed to generate, from an oxygen feed, a concentration of ozone in the exit gas from the ozone generator.
Figure 4B:
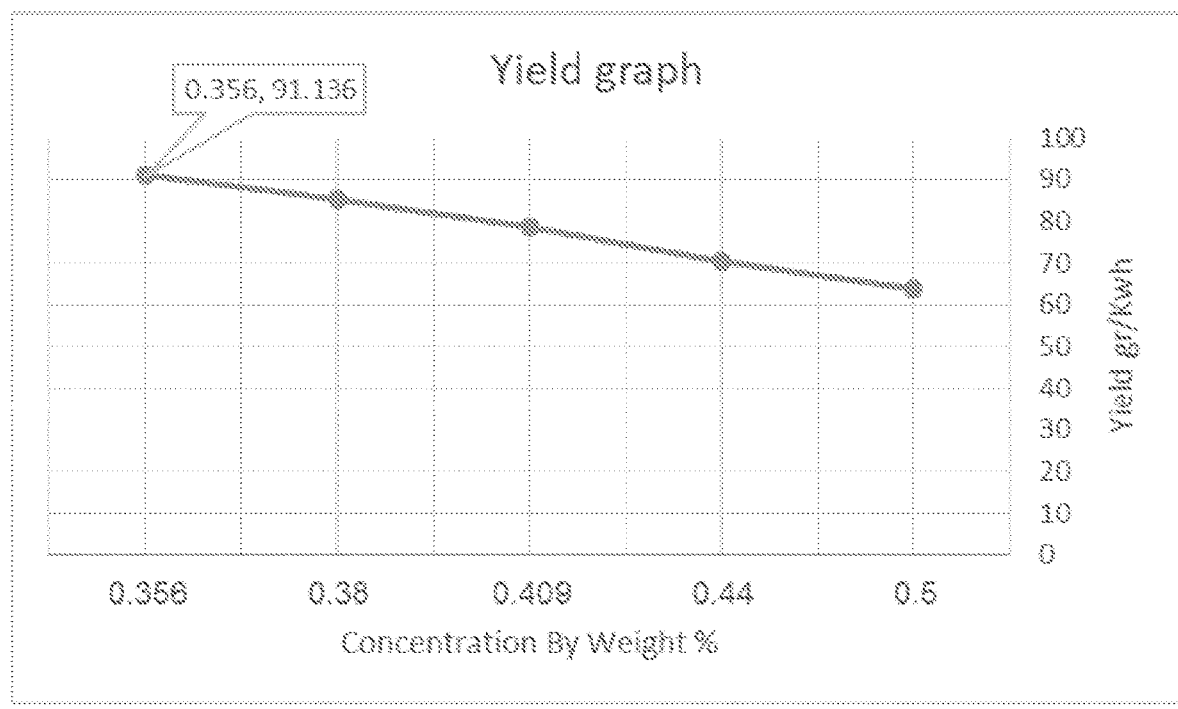
FIG. 4b illustrates the amount of power needed to generate, from a dry air feed, a concentration of ozone in the exit gas from the ozone generator.

FIG. 4a-b illustrates the amount of power needed to generate a concentration of ozone in the exit gas from the cold plasma ozone generator. FIG. 4a illustrates the yield if the input gas (the feed gas) is oxygen, while FIG. 4b illustrates the yield if the input gas (the feed gas) is dry air. For both oxygen input gas and dry air input gas, the yield decreases as the concentration of ozone in the exit gas increases. In other words, the amount of power needed to generate a concentration of ozone increases faster than the amount of ozone. Therefore, for the cold plasma ozone generator of the present invention, it is preferable to generate a somewhat smaller concentration of ozone in the exit gas in order to minimize the power requirements of the cold plasma ozone generator.

Example 2

Figure 5A:
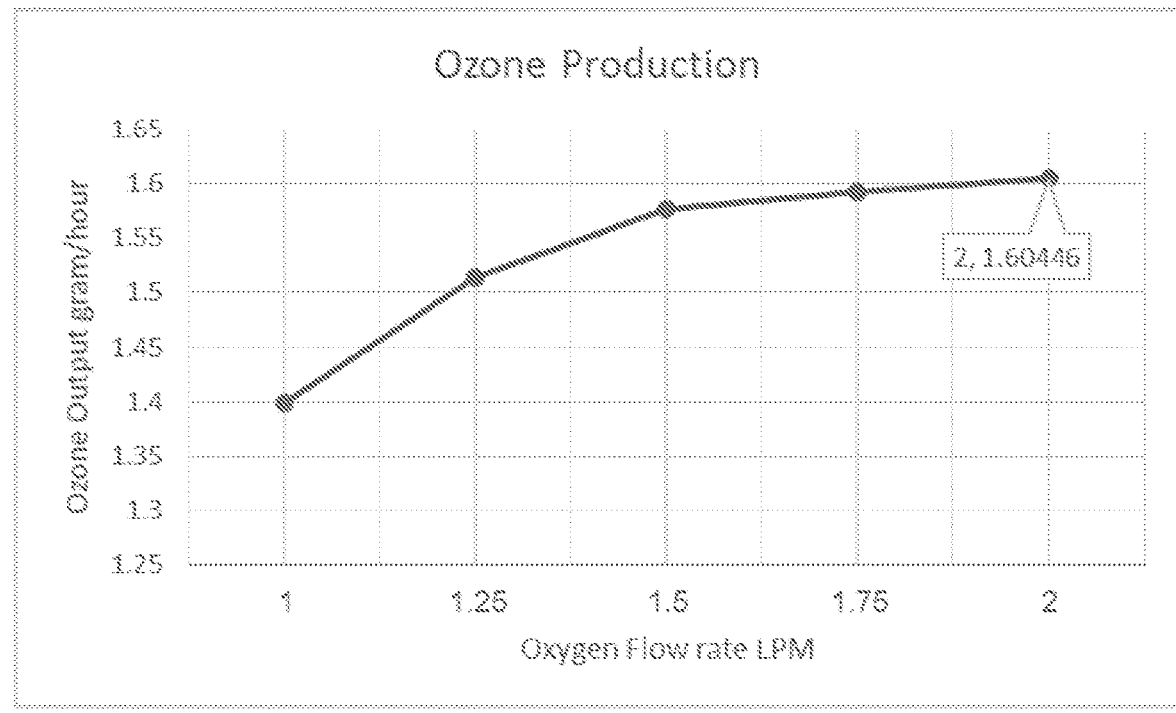
FIG. 5a-b illustrates the effect of oxygen flow rate on ozone generation for an oxygen input gas.
Figure 5B:
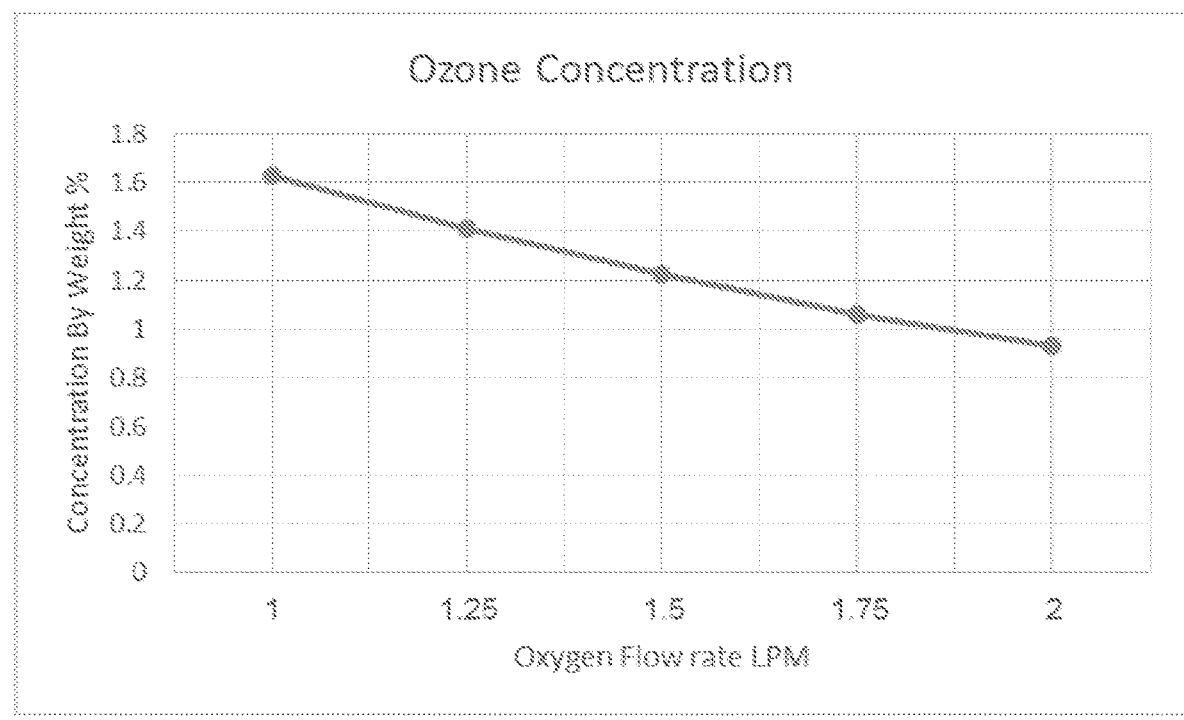

FIG. 5a-b illustrates the effect of oxygen flow rate on ozone generation for an oxygen input gas. The test was performed at 25 degrees C., using an Air Sep Onyx Plus Oxygen Concentrator to generate the input gas. The ozone in the output was measured using an Ozone Analyzer BMT 964. As the oxygen flow rate through the cold plasma ozone generator increased, the amount of ozone generated also increased (FIG. 5a), but the concentration of ozone in the exit gas decreased (FIG. 5b), since the amount of ozone generated increased more slowly than the flow rate.

Example 3

Figure 6A:
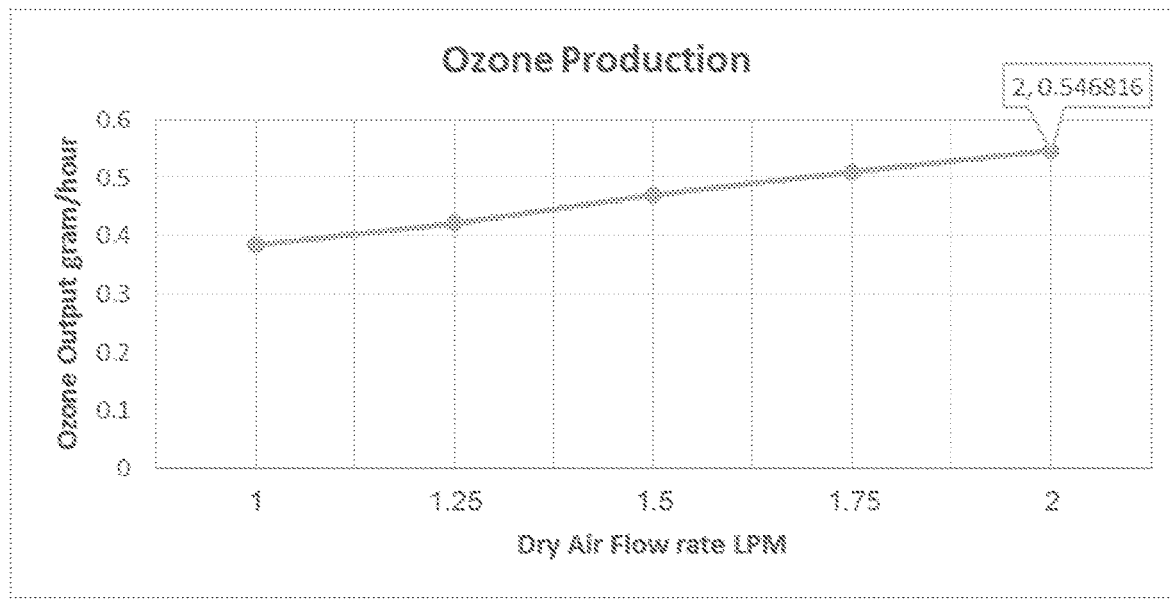
FIG. 6a-b illustrates the effect of air flow rate on ozone generation for an input gas of dry air.
Figure 6B:
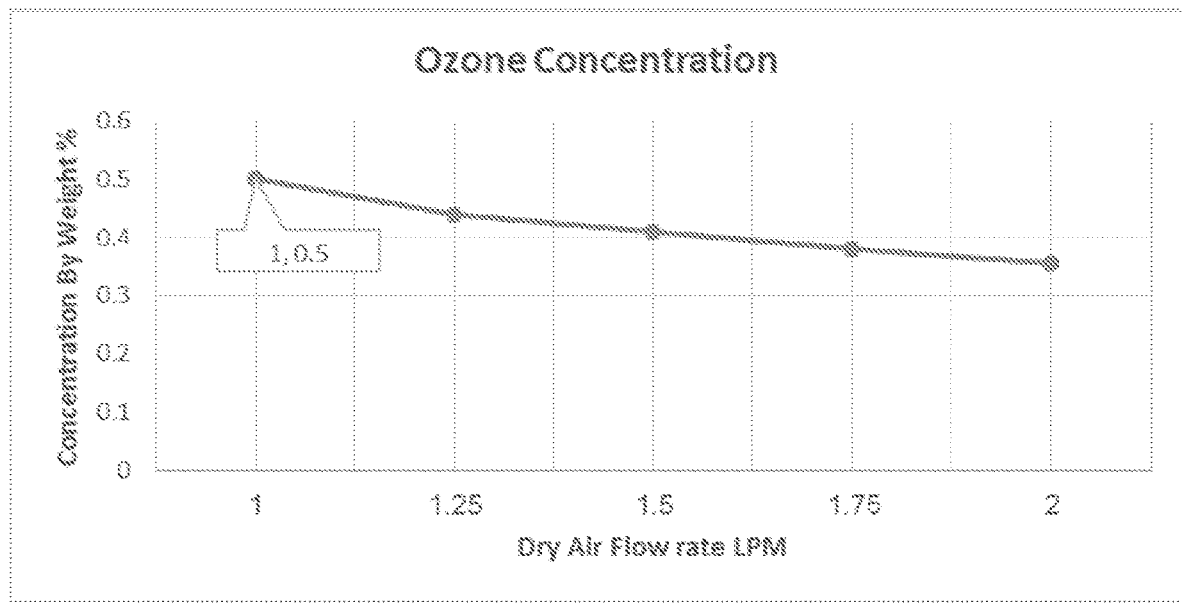

FIG. 6a-b illustrates the effect of air flow rate on ozone generation for an input gas of dry air. The test was performed at 25 degrees C., using a silica gel air dryer to remove water from the input gas. The ozone in the output was measured using an Ozone Analyzer BMT 964. As the air flow rate through the cold plasma ozone generator increased, the amount of ozone generated also increased (FIG. 6a), but the concentration of ozone in the exit gas decreased (FIG. 6b), since the amount of ozone generated increased more slowly than the flow rate.

For both an oxygen input gas and an air input gas, the ozone concentration changed approximately linearly with flow rate. However, although the ozone output increased approximately linearly with flow rate for the air input, it only increased sub-linearly with flow rate for the oxygen input gas.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A cold plasma ozone generator to generate ozone from oxygen in a gas, said cold plasma ozone generator comprising:
   an inlet gas port;
   at least one in-electrode, said in-electrode having a plurality of holes proximate a perimeter of the in-electrode; said plurality of perimeter holes are in fluid communication with said inlet gas port, said plurality of perimeter holes configured to allow gas to pass therethrough;
   at least one out-electrode, said out-electrode having at least one hole at the center of the out-electrode, said at least one hole configured to allow gas to pass therethrough;
   said in-electrode and said out-electrode configured to maintain AC voltage therebetween;
   at least one spacer between said in-electrode and said out-electrode, said spacer configured to maintain a constant-width gap between said in-electrode and said out-electrode, said constant-width gap configured to allow said gas to pass through said plurality of perimeter holes in said in-electrode and then radially inward from the perimeter of the gap to said at least one hole in said out-electrode; and
   an outlet port in fluid communication with said at least one hole in said out-electrode.

2. The cold plasma ozone generator of claim 1, wherein a thickness of said gap is in a range between about 0.1 mm and about 0.5 mm.

3. The cold plasma ozone generator of claim 2, wherein thickness of said gap is about 0.3 mm.

4. The cold plasma ozone generator of claim 1, wherein said gas is configured to flow radially inward from said plurality of perimeter holes to said at least one central hole to allow said gas to contact substantially all of an area in said gap between said electrodes so as to maximize an amount of ozone produced from said gas.

5. The cold plasma ozone generator of claim 1, wherein said AC voltage is about 1800 volts.

6. The cold plasma ozone generator of claim 1, wherein a frequency of said AC voltage is between about 7 kHz and about 30 kHz.

7. The cold plasma ozone generator of claim 6, wherein a frequency of said AC voltage AC is about 8 kHz.

8. The cold plasma ozone generator of claim 1, wherein an amount of ozone generated is controllable by adjustment of a frequency of said AC voltage AC.

9. The cold plasma ozone generator of claim 1, wherein a coating of ceramic dielectric material is bonded to at least one of said electrodes.

10. The cold plasma ozone generator of claim 9, wherein said ceramic dielectric coating is on a side of said at least one electrode facing said gap.

11. The cold plasma ozone generator of claim 9, wherein total thickness of said ceramic dielectric coating is about 75 to about 125 pm.

12. The cold plasma ozone generator of claim 9, wherein said ceramic dielectric coating is produced by means of a screen printing technique, followed by curing in an oven.

13. The cold plasma ozone generator of claim 1, wherein said gas is selected from a group consisting of oxygen, air, and any combination thereof.

14. The cold plasma ozone generator of claim 13, wherein said air is dry air.

* * * * *